Patented Jan. 1, 1952

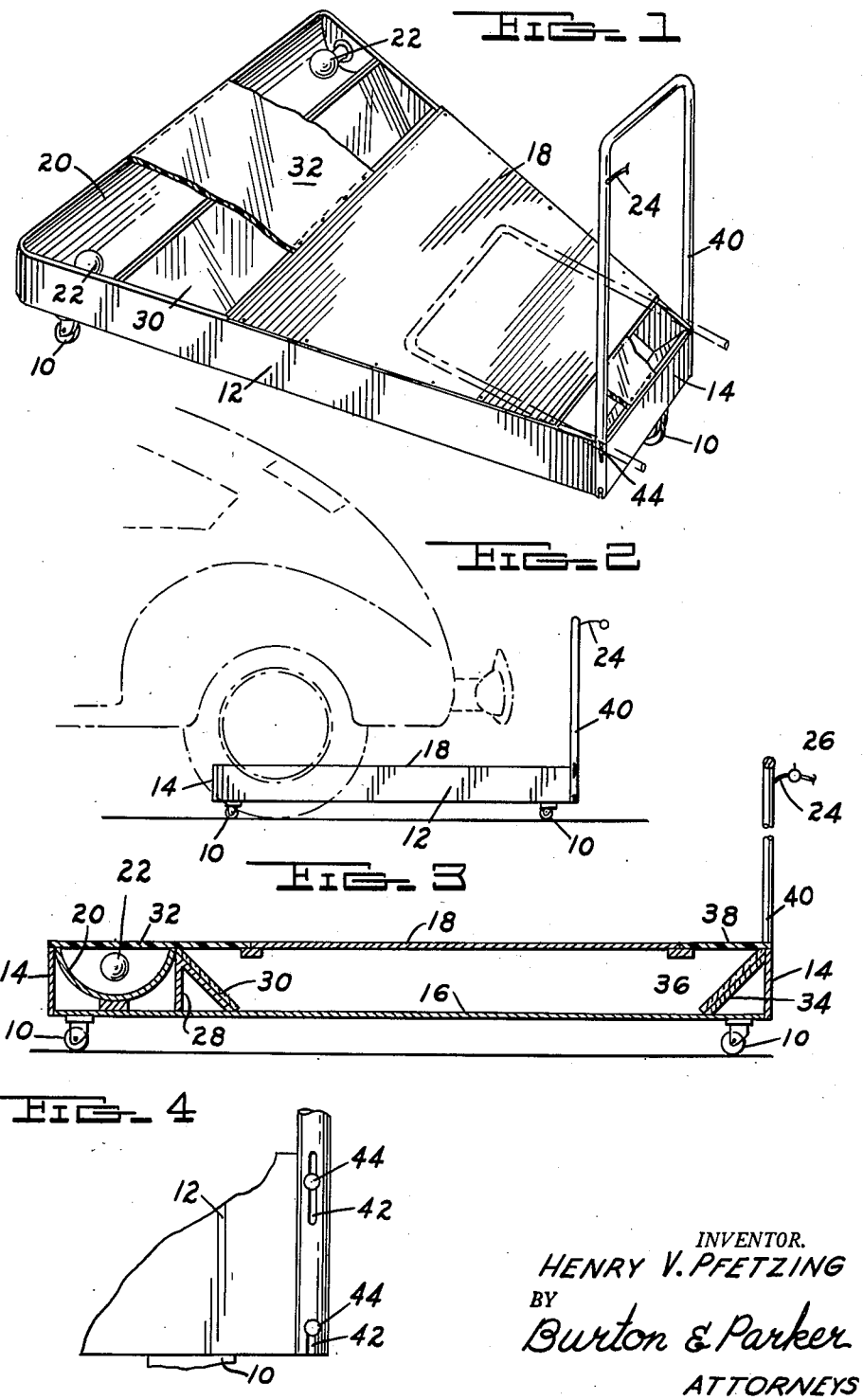

2,580,699

UNITED STATES PATENT OFFICE 2,580,699

APPARATUS FOR VIEWING THE UNDERCARRIAGE OF A VEHICLE

Henry V. Pfetzing, Jackson, Mich., assignor to Kent-Moore Organization, Inc., Detroit, Mich., a corporation of Michigan Application November 17, 1948, Serial No. 60,562

5 Claims. (Cl. 240—2.18)

This invention relates to an improved device and process of viewing the undercarriage of a vehicle.

An object is to provide a simple, inexpensive, easily operable mechanism for and method of viewing and of studying the entire underbody of a vehicle while the vehicle is standing on the floor and the observer is also standing on the floor.

To determine whether repair is necessary and the character of the repair needed on the underbody of a motor vehicle, it is now customary for the vehicle to be elevated on a hoist or for the mechanic to slide underneath the vehicle. Both methods are time consuming and neither method permits the customer to readily view the work free from exposure of dirt and grease thereof. Furthermore, occasions also arise in which when the vehicle is elevated and the load is taken off the wheels the parts needing correction do not display their defects because of the fact that the load has been taken off the wheels and the vehicle is not occupying a normal position.

With my improved apparatus and process it is possible to easily and quickly expose the entire undercarriage of the vehicle to the scrutiny of the mechanic and also to the scrutiny of the customer and while the vehicle is occupying its normal road position, and it is also possible for the mechanic to readily point out to the customer the correction required.

Another object is to provide a device of simple, compact construction, light weight and readily movable from one place to another and through the use of which the undercarriage of the vehicle may be illuminated and scrutinized and any observable defects may be easily pointed out to the owner of the vehicle.

Other objects, advantages and meritorious features will more fully appear from the following description, claims and accompanying drawings, wherein:

Fig. 1 is a perspective of a device embodying my invention;

Fig. 2 is a schematic view showing my undercarriage viewing instrument in elevation and adapted to be inserted underneath an automobile body;

Fig. 3 is a longitudinal sectional view through the viewing instrument shown in Fig. 1; and Fig. 4 is a fragmentary elevation of the handle connection.

In examining the undercarriage of a motor vehicle, it is now customary to elevate the vehicle upon a hoist or for the mechanic to slide underneath it on a platform cart. Both operations are time consuming. Neither permits the viewing of the undercarriage free from exposure to the dirt thereof. Furthermore, it is frequently desirable to examine the undercarriage while the vehicle is supported in the normal manner upon the road wheels. My improved viewing device is adapted to permit the viewing of the undercarriage of a vehicle while the same is supported upon the floor of a service station. It also permits the prospective work to be viewed by the owner as well as the mechanic.

The device comprises a low cart supported upon casters 10. The body of the cart is of elongate form comprising side walls 12 and end walls 14. The body is relatively shallow. It has a bottom wall 16 and an opaque top wall section 18 which superimposes the intermediate portion of the bottom wall. One end of the cart is here shown as wider than the other.

At the wide end of the cart there is provided within the interior of the body an elongate transverse trough 20 formed of suitable light reflecting material shaped as shown in Figs. 1 and 3. A light bulb 22 is supported within the body at each end of the trough. An electric light cord 24 may extend from the handle and through the body to these light bulbs. It may be provided with a control switch 26 and coupled with a suitable extension cord.

An angular transverse frame 28 extends across the body adjacent to the reflector 20 and serves as a support for a mirror 30. The mirror extends from the inner margin of the reflector trough toward the floor 16 of the body at an angle of approximately 45° with respect to the plane of the body. This mirror is secured to and supported by the transverse frame member 28. A transparent plate 32 which may be formed of relatively non-shatterable plastic or the like extends across the top of the body directly above the reflector trough and the mirror 30 as shown in Figs. 1 and 3. This plate permits light rays to pass readily therethrough. It also protects the mirror 30 and the reflector trough from accidental injury.

At the opposite end of the body is a transverse supporting frame member 34. Secured to the face of this frame member is a mirror 36. This mirror 36 faces the mirror 30 and is disposed at an angle of substantially 45° with respect to the plane of the body. A non-shatterable transparent plate 38 is disposed directly above the mirror 36. The panel 18 is formed of opaque material. It extends between the panels 32 and 38 and forms with the side walls and the bottom wall of the body a tunnel which is darkened inside and constitutes a passageway for a transmission of light rays from the mirror 30 to the mirror 36.

A handle 40 is secured to the narrow end of the body. The uprights of this handle are shown as provided with slots 42 at their bottom ends. Thumb screws 44 are provided to secure the handle to the body and to permit the handle to be elevated so that it can be swung to a flat position on top of the body in order that the device may be stored within a minimum of space.

When it is desired to observe the undercarriage of a vehicle, the wide end of the device is shoved underneath of the vehicle and the electric lights are turned on to illuminate the undercarriage. The device is so positioned that the desired part of the undercarriage is illuminated and is reflected in the mirror 30. The reflection in the mirror 30 is visible in the mirror 36. The mirror 36 is disposed outside of the vehicle so that it can be viewed by the mechanic and an observer. The particular work to be done can, therefore, be easily ascertained.

What I claim is:

1. An undercarriage viewing instrument comprising, in combination, a generally elongate trapezoidal-shaped flat box-like frame provided with means supporting the same upon a floor for sliding movement thereover, light emitting means disposed at the wide end of said frame to project a laterally elongated parallel light beam upwardly and transversely with respect to the frame, an elongate upwardly facing mirror disposed adjacent and parallel to the light emitting means and substantially coextensive therewith transversely of the frame, a second mirror disposed at the opposite end of the frame facing the first mirror and facing upwardly, said frame provided between the mirrors with a top wall forming with the bottom and sides of the frame an enclosure extending between the the mirrors.

2. An undercarriage viewing instrument comprising, in combination, a generally elongate flat box-like frame having its bottom provided with means to support the same upon the floor for sliding movement thereover, an upwardly disposed light reflector trough mounted within the frame and extending transversely thereacross at one end, a light associated with the reflector to have its rays directed upwardly thereby, a mirror mounted within the frame and extending transversely thereacross parallel and adjacent to the reflector, said mirror disposed to extend downwardly from the inner edge of the reflector at an angle of substantially 45° with respect to the plane of the frame, a second mirror extending transversely across the opposite end of the frame facing the first mirror and disposed at an angle of substantially 45° with respect to the plane of the frame, said frame provided between the mirrors with a top wall forming with the bottom and side walls an enclosure extending between the mirrors.

3. An undercarriage viewing instrument comprising, in combination, a generally elongate flat box-like frame provided with means to support the same upon the floor and sliding movement thereover, said frame having a width at one end substantially greater than at the opposite end, a trough-shaped reflector mounted within the frame and extending transversely thereof at the wide end and disposed facing upwardly, light means mounted within the reflector to have its rays directed upwardly thereby, a mirror mounted within the frame disposed adjacent to and extending parallel to the reflector and approximately coextensive therewith transversely of the frame and facing upwardly, a second mirror mounted within the frame adjacent to the opposite end thereof extending transversely across the frame facing the first mirror and facing upwardly and having a length substantially less than that of the first mirror, said frame provided between the mirrors with an opaque top wall forming with the bottom and side walls an enclosure extending between the mirrors, said top wall having transparent end portions extending over the mirrors and over the reflector trough.

4. An undercarriage viewing instrument comprising, in combination, a generally elongate trapezoidal-shaped flat box-like frame provided with means supporting the same upon a floor for sliding movement thereover, a reflector trough at the wide end of the frame extending transversely thereof, light emitting means associated with the trough to project a laterally elongated parallel light beam upwardly and transversely with respect to the frame, an elongated upwardly facing mirror disposed adjacent and parallel to the reflector trough and substantially coextensive therewith transversely of the frame, a second mirror disposed at the opposite end of the frame facing the first mirror and facing upwardly, said first mentioned mirror having a substantially greater length than the last mentioned mirror.

5. An undercarriage viewing instrument comprising, in combination, a generally elongate trapezoidal-shaped flat box-like frame provided with means supporting the same upon a floor for sliding movement thereover, light emitting means disposed at the wide end of said frame to project a laterally elongated parallel light beam upwardly and transversely with respect to the frame, an elongate upwardly facing mirror disposed adjacent and parallel to the light emitting means and substantially coextensive therewith transversely of the frame, a second mirror disposed at the opposite end of the frame facing the first mirror and facing upwardly, said frame provided between the mirrors with a top wall forming with the bottom and sides of the frame an enclosure extending between the mirrors, said light emitting means comprising a reflector trough disposed within the frame and extending transversely thereof at the large end of the frame and the first mentioned mirror having a length substantially greater than the length of the last mentioned mirror and said mirrors disposed at an angle of substantially 45° with respect to the plane of the frame.

HENRY V. PFETZING.

REFERENCES CITED

The following references are of record in the file of this patent:

UNITED STATES PATENTS

| Number | Name | Date |
|--------|------|------|
| 2,188,677 | Dickinson | Jan. 30, 1940 |
| 2,325,253 | Laging | July 27, 1943 |
| 2,364,670 | Stamy et al. | Dec. 12, 1944 |